US007843312B2

(12) United States Patent
Eskildsen et al.

(10) Patent No.: US 7,843,312 B2
(45) Date of Patent: Nov. 30, 2010

(54) WIRELESS CONTROL OF SECURITY SYSTEM WITH KEY-OPERATED KEY FOB

(75) Inventors: Kenneth G Eskildsen, Great Neck, NY (US); Robert E Lee, Garden City, NY (US); David S Zakrewski, Babylon, NY (US)

(73) Assignee: Honeywell International Inc., Morristown, NJ (US)

( * ) Notice: Subject to any disclaimer, the term of this patent is extended or adjusted under 35 U.S.C. 154(b) by 1004 days.

(21) Appl. No.: 11/637,341

(22) Filed: Dec. 12, 2006

(65) Prior Publication Data

US 2008/0136585 A1 Jun. 12, 2008

(51) Int. Cl.
*H04B 1/02* (2006.01)

(52) U.S. Cl. ............. 340/5.64; 340/426.35; 340/426.36

(58) Field of Classification Search ................ 340/5.64, 340/5.7, 825, 5.1–5.2, 5.6, 426.28
See application file for complete search history.

(56) References Cited

U.S. PATENT DOCUMENTS

| | | | | |
|---|---|---|---|---|
| 4,035,791 | A * | 7/1977 | Katayama | 340/522 |
| 5,025,426 | A * | 6/1991 | Blumberg et al. | 368/10 |
| 6,080,941 | A * | 6/2000 | Yokobori | 200/6 A |
| 6,225,903 | B1 | 5/2001 | Soloway et al. | |
| 6,237,378 | B1 * | 5/2001 | Canard | 70/252 |
| 6,246,019 | B1 * | 6/2001 | Nakamura et al. | 200/6 A |
| 6,386,007 | B1 * | 5/2002 | Johnson et al. | 70/408 |
| 6,441,735 | B1 * | 8/2002 | Marko et al. | 340/542 |
| 6,462,291 | B1 * | 10/2002 | Sachs | 200/302.2 |
| 6,720,861 | B1 * | 4/2004 | Rodenbeck et al. | 340/5.64 |
| 6,812,836 | B2 * | 11/2004 | Soloway et al. | 340/542 |
| 6,963,280 | B2 | 11/2005 | Eskildsen | |
| 7,041,924 | B2 * | 5/2006 | Jeschke et al. | 200/302.2 |
| 7,142,111 | B2 | 11/2006 | Eskildsen et al. | |
| 7,166,812 | B2 * | 1/2007 | White et al. | 200/341 |
| 2003/0190906 | A1 * | 10/2003 | Winick | 455/404.1 |
| 2005/0012594 | A1 * | 1/2005 | Shim | 340/5.72 |
| 2006/0109080 | A1 * | 5/2006 | Tang et al. | 340/5.72 |
| 2006/0144683 | A1 * | 7/2006 | White et al. | 200/341 |
| 2006/0145810 | A1 * | 7/2006 | Buccinna et al. | 340/5.72 |

(Continued)

FOREIGN PATENT DOCUMENTS

| | | | |
|---|---|---|---|
| CA | 2537208 | A1 | 8/2007 |

(Continued)

*Primary Examiner*—Brian A Zimmerman
*Assistant Examiner*—James Yang
(74) *Attorney, Agent, or Firm*—Barkume & Associates, P.C.

(57) ABSTRACT

A key fob with a housing into which a deadbolt key is mounted such that the shank protrudes therefrom, enabling a user to turn the housing and cause the key to lock or unlock the door. Within the keyfob are a pair of switches or other sensing means configured to close on either the turning of the housing in a first (clockwise) direction or a second (counterclockwise) direction. Based on the direction the housing is turned, either a first coded signal or a second coded signal is transmitted to a control panel. The control panel will then either arm or disarm the security system based on how it has been programmed during installation. This enables the user to easily arm the system when the door is being locked and disarm the system when the door is being unlocked without requiring a separate action on the part of the user.

14 Claims, 3 Drawing Sheets

U.S. PATENT DOCUMENTS

| | | | | |
|---|---|---|---|---|
| 2007/0024442 | A1* | 2/2007 | Jolley et al. | 340/542 |
| 2008/0084299 | A1* | 4/2008 | Fisher et al. | 340/542 |
| 2008/0238669 | A1* | 10/2008 | Linford | 340/542 |
| 2009/0002153 | A1* | 1/2009 | Berstis et al. | 340/539.11 |

FOREIGN PATENT DOCUMENTS

| | | | |
|---|---|---|---|
| DE | 4327294 | A1 | 7/1994 |
| EP | 0373407 | A1 | 11/1989 |
| EP | 1840699 | A2 | 10/2007 |
| FR | 2544782 | A1 | 4/1984 |
| GB | 2290578 | A | 6/1994 |
| GB | 2322903 | A | 9/1998 |

* cited by examiner

WIRELESS CONTROL OF SECURITY SYSTEM WITH KEY-OPERATED KEY FOB

TECHNICAL FIELD

This invention relates to security systems, and in particular to the automatic arming and disarming of a security system based on turning a mechanical key and key fob in a lock cylinder of an entrance door.

BACKGROUND ART

Alarm systems monitor sensors to determine the presence of people within a protected space. If the alarm system detects a breach of the protected space it will respond based on the state of the system. Possible system states include "Disarmed", "Armed Stay", and "Armed Away." If the system is disarmed it will not alarm to perimeter or interior sensors. If the system is armed stay it will alarm to a breach of the perimeter sensors but not to the interior sensors. If the system is armed away it will alarm to a breach of the perimeter or interior sensors. The state of the system is determined by the needs of the occupants of the premises. If all of the occupants are leaving the premises then the system should be armed away. If the occupants will be staying within the premises for an extended period of time then the system should be armed stay. For all other scenarios the system should be disarmed.

Problems arise when the system is not properly armed and disarmed. Typical problems include not disarming the system before the alarm sounds, arming away when occupants plan to stay within the protected space, and not arming the system when the premises are unoccupied. These are user-created problems and as such, it is desirable to develop a system that will assist the end user with the arming and disarming operations.

Others have provided partial improvement by offering security systems that will assist the end user with arming and disarming. One such system, as described in U.S. Pat. No. 6,225,903, is armed and disarmed by the action of the deadbolt on the entry door. A switch is mounted in the doorjamb to detect when the bolt is extended into the jamb, i.e. locked. If the deadbolt is locked and alarm system does not detect motion within a predetermined exit time then the system will transition to the armed away state. If motion is detected then it will transition to the armed stay state. If the system is armed and the deadbolt is unlocked then the system will transition to the disarmed state. A major drawback with this arrangement occurs if the intruder picks the lock to open the deadbolt. Although this is an unauthorized entry the alarm system will disarm allowing the perpetrator full access to the premises.

U.S. Pat. No. 6,963,280, DOOR SECURITY DEVICE FOR USE IN SECURITY SYSTEMS, owned by the assignee of this application, is an improvement on the '903 patent, and relates to a door entry security device used in a security system including a control panel, the door security device in a housing suitable for mounting within a recess of a doorjamb or door of a premises. In the housing is a lock position detecting switch, configured to detect the position of a lock mounted on a door as being either locked or unlocked, a door position detecting switch configured to detect the position of the door as being either open or closed, and processing circuitry configured to generate a security system disarm signal when (1) the position of the lock has transitioned from a locked state to an unlocked state, (2) the door is closed at the time that a predefined time period has elapsed since the position of the lock transitions from a locked state to an unlocked state, and (3) the door has been opened after that predefined time period has elapsed. The door entry device also has a data transmitter for sending the security system disarm signal to the control panel. An alarm signal is generated and transmitted to the control panel when the door is open at the time that the predefined time period has elapsed since the lock has transitioned to an unlocked state. The control panel prevents the security system from being disarmed when an alarm signal is received unless a user code is entered into the security system.

U.S. Pat. No. 7,142,111, METHOD OF PROGRAMMING SECURITY CONTROL PANELS FOR DOOR ENTRY DEVICE COMPATABILITY, also owned by the assignee of this application, relates to specific methodologies for programming a control panel to operate in conjunction with the device of the '280 patent.

The present invention is a different approach from the '903, '280 and '111 patents and provides an arrangement that solves the assisted security system interface problem in several ways. It provides a means to arm and disarm the security system with a minimum of intervention from the end user. It provides a means to ensure that the system is armed when needed, eliminating the unoccupied and unarmed premises problem. It provides a means to reliably disarm the system to eliminate entry delay false alarms. It also provides a means to verify that the person entering the premises is authorized to do so. In addition, there is no need to modify the door jamb or deadbolt as with the aforementioned prior art patents.

DISCLOSURE OF THE INVENTION

The present invention pertains to a security system arming and disarming arrangement that includes a deadbolt, a wireless security system, and a wireless key fob configured to accept a deadbolt key. One aspect of this invention lies within the interaction between the key and the key fob. Within a recess of the key fob is a mounting plate for the key. The mounting plate is designed to accept a typical deadbolt key. The key fob is sold without the key and the security installer will attach the homeowner's deadbolt key to the mounting plate within the key fob. The mounting plate is designed to rotate or pivot within the key fob housing, however, its travel is limited by the circuit board and housing. As such, the key will only rotate several degrees (clockwise or counterclockwise) within the housing to the point where the mounting plate contacts the printed circuit board or housing. At the point where the mounting plate contacts the printed circuit board is a pair of conductors that will be shorted by a contact pad on the mounting plate. There are two sets of conductors and two contact pads. One pad-conductor combination will short due to a clockwise rotation of the key. The other pad-conductor combination will short due to a counter-clockwise rotation of the key. This effectively creates two switches; one switch will close when the key is rotated clockwise with respect to the housing; the other switch will close when the key is rotated counter-clockwise with respect to the housing. Each switch is connected to a button input on the key fob. When the key is inserted into a lock cylinder, a third switch protruding from the key fob contacts the lock cylinder enabling the fob, then as the key is turned clockwise, the switch associated with the clockwise motion will short and the key fob will send an RF transmission to the control panel. The same is true for the counterclockwise motion. The panel will accept this message and execute a preprogrammed function, such as but not limited to arming or disarming the panel. For example, the installer can program the panel to arm based on a clockwise or counterclockwise motion and disarm on the opposite rotation as the arm command. The control panel may also be configured to execute more sophisticated functions based on other inputs such as the status of other entrance door locks, whether the premises are occupied or not, etc.

Thus, the present invention in particular is a key fob with a housing, the housing having a recess with a mounting plate configured to accept a head of a key, and an opening configured to allow a shank of the key to protrude therefrom when the head of the key is placed on the mounting plate. A fulcrum is integral with an inner wall within the recess and arranged to enable the mounting plate to rest thereon, the fulcrum generally bisecting the recess into a first region on a first side of the mounting plate and a second region on the second side of the mounting plate. A first switch is located in the first region, and a second switch is located in the second region. Each of the switches is configured to be in an open position when the mounting plate rests on the fulcrum in a nominal position. The first switch is caused to close when the housing is turned in a first direction with respect to the mounting plate mounted with the head of the key, and the second switch is caused to close when the housing is turned in a second direction with respect to the mounting plate mounted with the head of the key. Also within the housing is circuitry configured to transmit a first signal when the first switch is closed and a second signal when the second switch is closed.

The key fob preferably also has a third switch located on an outer face of the housing and configured to close when the outer face of the housing is urged against a lock cylinder when the shank of the key is inserted into the lock cylinder. The processing circuitry is then configured to transmit the first signal and the second signal only when the third switch is closed, thus preventing accidental transmission of signals when the key fob is in the user's pocket.

A control panel in the security system operates in association with a wireless receiver configured to receive the first signal and the second signal from the circuitry of the key fob and provide digital coded signals representative thereof to the control panel for processing. The control panel is configured to decode the coded signals to disarm the security system on receipt of a first one of the coded signals and to arm the security system on receipt of a second one of the coded signals.

BEST MODE FOR CARRYING OUT THE INVENTION

Figure 1A:
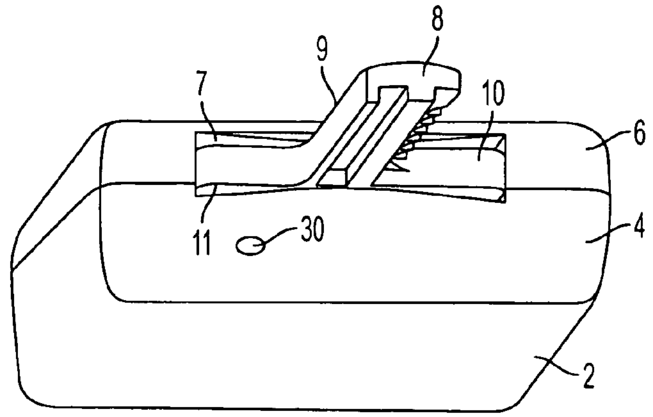
FIG. 1A is the key fob assembly with a key inserted in the nominal position.

The preferred embodiments of the present invention will now be described with respect to the Figures. FIG. 1A illustrates a perspective view of the key fob having a deadbolt key 9 mounted in a housing 2. The housing is formed from a base 4 and a cover 6. The key 9 has a key head 10 that sits on a mounting plate (not shown) within a recess 7 of the housing 2 such that the shank 8 of the key 9 protrudes through an opening 11 of the housing as shown. This enables a user to easily grasp the housing 2 and insert the shank 8 into a lock cylinder of a door and then turn the housing to cause the key to engage in the lock cylinder and engage or disengage the lock as known in the art.

Figure 1B:
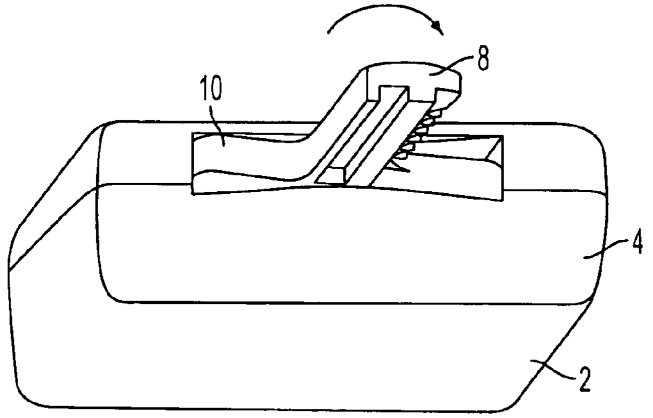
FIG. 1B is the key fob assembly with the key rotated in the clockwise direction.
Figure 1C:
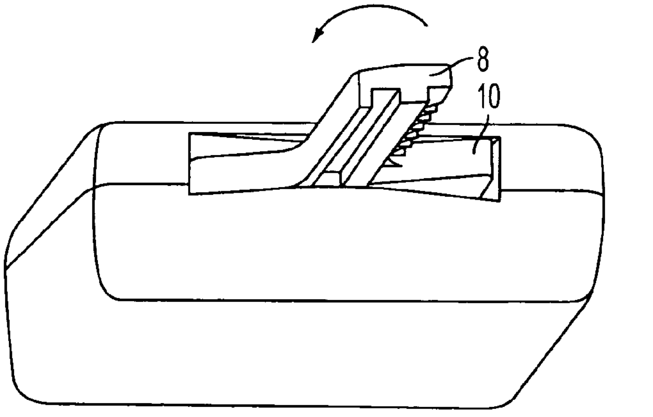
FIG. 1C is the key fob assembly with the key rotated in the counterclockwise direction.

In accordance with the present invention, it is desired to be able to transmit one of two possible coded RF signals to a control panel (via a wireless receiver) and either arm the system (as the door is being locked) or disarm the system (as the door is being unlocked). Turning the housing as described below will cause either of these two signals to be generated and transmitted based on the direction the housing is being turned. Since turning the key and housing clockwise may lock the door in some installations but may unlock the door in other installations (e.g. depending on whether the lock is on the right side of the door or the left side of the door), the signals generated indicate to the control panel either a first (clockwise) direction or a second (counterclockwise) direction. The control panel will be programmed during installation to take the desired action based on the installation parameters; for example, arm or disarm the system on receipt of the first signal, and do the opposite (disarm or arm) on receipt of the second signal. Other actions may be taken, which may depend on other input and/or status parameters of the system. FIGS. 1B and 1C illustrate rotation of the housing with respect to the key in both these directions.

Figure 2A:
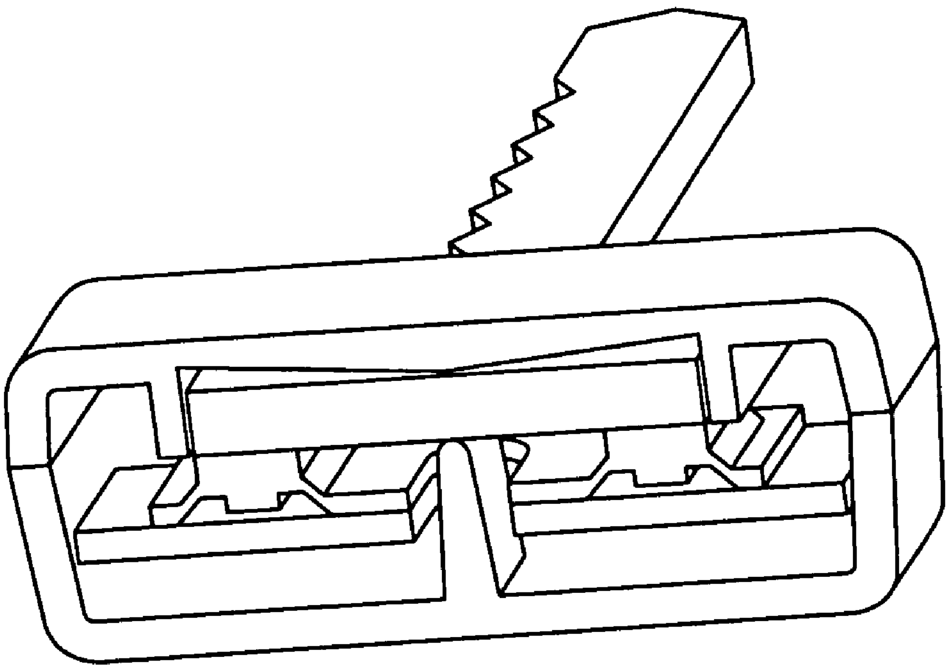
FIGS. 2A and 2B illustrate a cutaway view of the key fob.
Figure 2B:
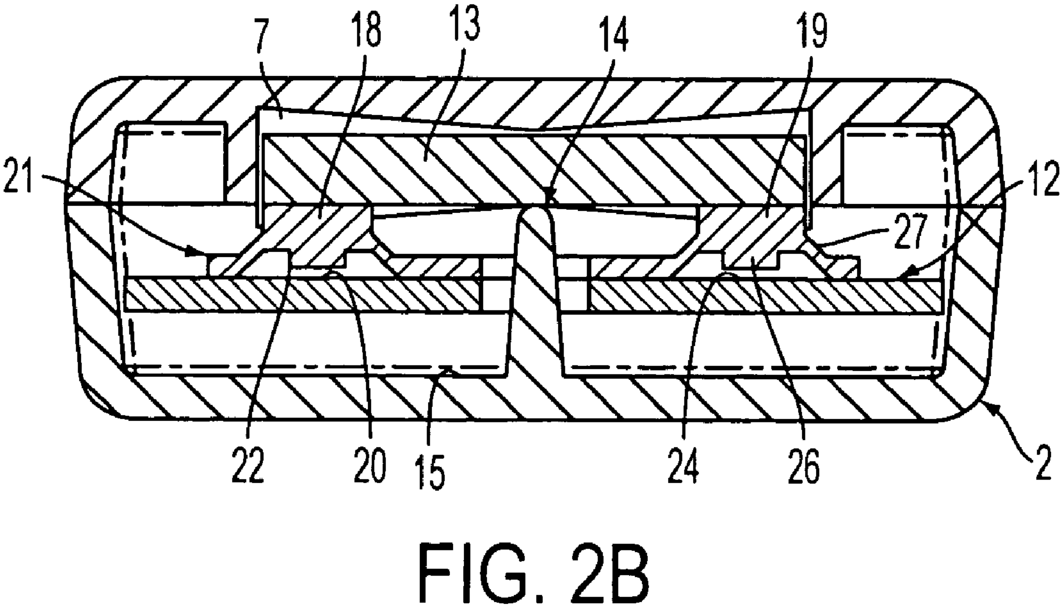

Reference is now made to FIGS. 2A and 2B, which show a cross section of the inside of the key fob. As can be seen, the key head 10 rests on a mounting plate 13, which is located within the recess 7 of the housing 2. A fulcrum 14 provides support to the mounting plate/key head assembly as well as a pivot point for turning the housing and key in the cylinder. As shown, the fulcrum 14 is integral with an inner wall 15 within the recess 7. The location of the fulcrum 14 bisects the recess 7 into a first region on a first side of the mounting plate 13 (the left side in this Figure) and a second region on the second side of the mounting plate (the right side in this Figure). A first switch 18 is located in the first region, and a second switch 19 is located in the second region. Each of the switches 18, 19 will be in an open position when the mounting plate 13 rests on the fulcrum 14 in a normal or nominal position. The first switch 18 is caused to close when the housing is turned in a first direction with respect to the mounting plate mounted with the head of the key, and the second switch 19 is caused to close when the housing is turned in a second direction with respect to the mounting plate mounted with the head of the key. Also within the housing is a printed circuit board that has RF transmission circuitry configured to transmit a first signal when the first switch 18 is closed and a second signal when the second switch 19 is closed.

Thus, by turning the housing with the key in the lock cylinder, rotational torque imparted on the housing will cause the first or second switch to close and the key will turn with the housing as well, locking or unlocking the door as the case may be. That is, the housing and key will turn with respect to each other, making closure of either switch 18 or switch 19, depending on the rotation direction. FIGS. 1B and 1C illustrate these principles.

In particular, the first switch 18 includes a first fixed contact 20 on the printed circuit board 12 and a first moveable contact 22 supported by a first biasing device, which in the preferred embodiment is a rubber support 21. The rubber biasing device causes the first moveable contact 22 to be in proximity to but not in contact with the first fixed contact 20 when the mounting plate and the head of the key are in the nominal fulcrum position. Likewise, the second switch 19 includes a second fixed contact 24 on the printed circuit board 12 and a second moveable contact 26 supported by a second biasing device, which again in the preferred embodiment is a rubber support 27. The rubber biasing device causes the second moveable contact 26 to be in proximity to but not in contact with the second fixed contact 24 when the mounting plate and the head of the key are in the nominal fulcrum position.

When the key is inserted in a lock cylinder and the housing is turned in a first direction, the mounting plate will pivot or rotate about the fulcrum and cause the first moveable contact 22 to be urged towards and make contact with the first fixed contact 20, closing the switch and causing the first signal to be transmitted (and thus either arming or disarming the system as programmed during installation). Similarly, when the key is inserted in a lock cylinder and the housing is turned in a second direction, the mounting plate will pivot or rotate about the fulcrum and cause the second moveable contact 26 to be urged towards and make contact with the second fixed contact 24, closing the switch and causing the second signal to be transmitted (and thus either disarming or arming the system as programmed during installation). In both cases, turning the housing further causes the key to turn the lock cylinder as desired.

Optionally, the processing logic 31 may be configured to prevent multiple transmissions from a single locking operation. For example, the processing logic may be prevented from sending the counterclockwise signal immediately after sending a clockwise signal unless a predetermined period of time has elapsed, thus preventing an unwanted disarming of the system immediately after it is armed, or vice versa. That is, in this mode, the processing logic will ignore any subsequent switch closures until after the predetermined time has elapsed from the switch closure that initiates the signal transmission.

Also shown is a third switch (a safety switch) 30 located on an outer face of the housing and configured to close when the outer face of the housing is urged against a lock cylinder when the shank of the key is inserted into the lock cylinder. The processing circuitry is then configured to transmit the first signal and the second signal only when the third switch is closed, thus preventing accidental transmission of signals when the key fob is in the user's pocket. The third switch may reside within the housing rather than externally, for example the mounting plate/key may be able to slide within the housing such that an internal switch is activated when the key is inserted into a cylinder and the key meets with resistance.

Figure 3:
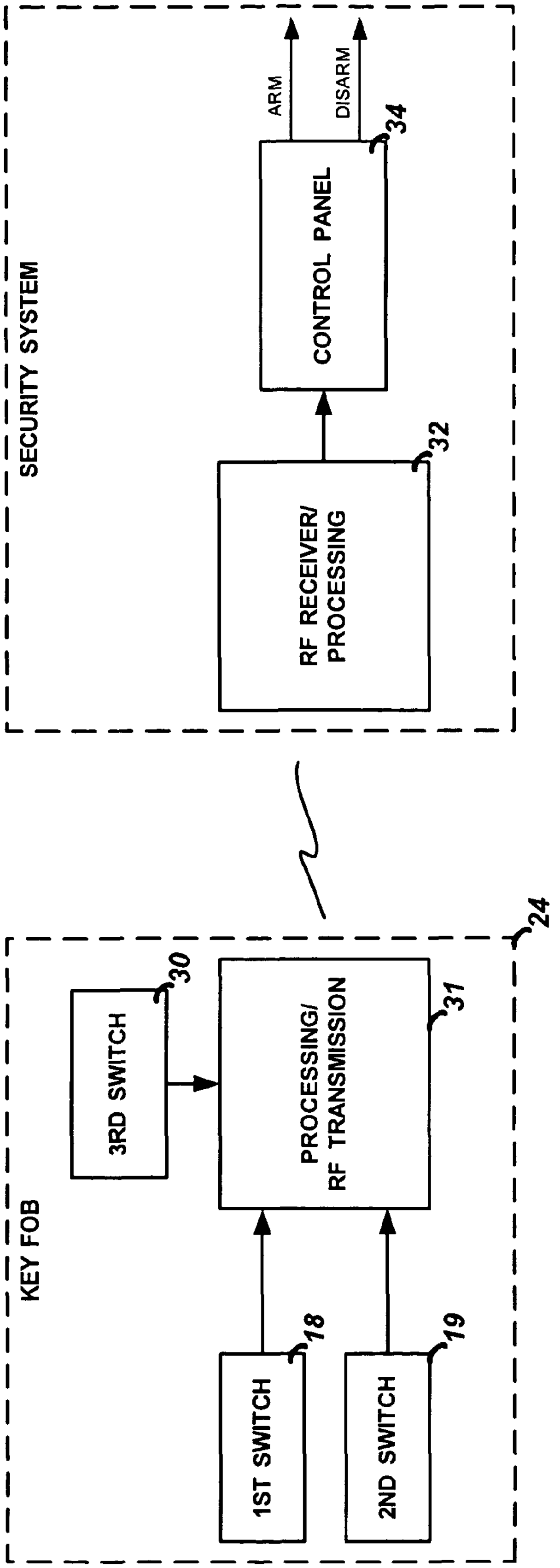
FIG. 3 is a block diagram of the operation of the invention.

FIG. 3 illustrates a block diagram of the system, with the first switch 18, the second switch 19, and the third switch 30 all functionally providing inputs to a processing logic and RF transmission circuit 31, which is laid out on the printed circuit board as known in the art. Also shown as known components RF receiver 32, which receives the RF signals from the transmitter 31 and provides coded digital signals to the control panel 34 for processing as described above. The control panel will provide an arm signal or a disarm signal depending on how it has been programmed to respond to receipt of the corresponding signals from the key fob.

Other embodiments exist wherein alternative devices are implemented to ascertain if the housing is being tilted or rotated. For example, a tilt switch or switches could be used, or an accelerometer or magnetic field sensor could be used in conjunction with the housing. Processing circuitry operates in conjunction with these sensors to cause the RF signals to be transmitted based on the direction the housing is turned as described herein. The fulcrum may be omitted and the key held in a fixed or quasi-fixed position within the housing, wherein the relative tilt of the housing detected and signals transmitted accordingly.

It will be apparent to those skilled in the art that modifications to the specific embodiment described herein may be made while still being within the spirit and scope of the present invention

What is claimed is:

1. A portable hand-held key-operated keyfob combination comprising:

A) a lock-opening key comprising a head and a shank protruding therefrom, the shank of the key arranged so as to operate a mechanical door lock; and B) a portable hand-held key fob comprising:

a) a housing comprising (i) a recess comprising a mounting plate against which the head of the key is mounted;

(ii) an opening configured to allow the shank of the key to protrude therefrom; and (iii) a fulcrum integral with an inner wall within the recess on which the mounting plate rests thereon, the fulcrum generally bisecting the recess into a first region on a first side of the mounting plate and a second region on a second side of the mounting plate;

b) a first switch located in the first region, and a second switch located in the second region, each of said switches configured to be in an open position when the mounting plate rests on the fulcrum in a nominal position, the first switch being caused to close when the housing is turned in a first direction with respect to the mounting plate mounted with the head of the key, and the second switch being caused to close when the housing is turned in a second direction with respect to the mounting plate mounted with the head of the key; and c) circuitry, comprising an RF transmitter, configured to transmit a first RF signal when the first switch is closed and a second RF signal when the second switch is closed.

2. The key fob combination of claim 1 further comprising a third switch located on an outer face of the housing and configured to close when the outer face of the housing is urged against a lock cylinder when the shank of the key is inserted into the lock cylinder; wherein the circuitry is further configured to transmit the first signal and the second signal only when the third switch is closed.

3. The key fob combination of claim 1 further comprising a printed circuit board for the circuitry, wherein the first and the second switches are integral with the printed circuit board.

4. The key fob combination of claim 3 wherein:

the first switch comprises a first fixed contact on the printed circuit board and a first moveable contact supported by a first biasing device, the first biasing device causing the first moveable contact to be in proximity to but not in contact with the first fixed contact when the mounting plate and the head of the key is not urged thereagainst and allowing the first moveable contact to be urged against and make electrical contact with the first fixed contact when the mounting plate and the head of the key is urged thereagainst as a result of turning the housing in the first direction with respect to the mounting plate and the head of the key; and the second switch comprises a second fixed contact on the printed circuit board and a second moveable contact supported by a second biasing device, the second biasing device causing the second moveable contact to be in proximity to but not in contact with the second fixed contact when the mounting plate and the head of the key is not urged thereagainst and allowing the second moveable contact to be urged against and make electrical contact with the second fixed contact when the mounting plate and the head of the key is urged thereagainst as a result of turning the housing in the second direction with respect to the mounting plate and the head of the key.

5. The key fob combination of claim 4 wherein the first biasing device and the second biasing device each comprise a rubber support interconnected to the printed circuit board.

6. A security system comprising the key fob combination of claim 1, further comprising a control panel operating in association with a wireless receiver configured to receive the first signal and the second signal from the circuitry of the key fob and provide digital coded signals representative thereof to the control panel for processing, the control panel configured to decode the coded signals to disarm the security system on receipt of a first one of the coded signals and to arm the security system on receipt of a second one of the coded signals.

7. A portable hand-held key-operated keyfob combination comprising:

A) a lock-opening key comprising a head and a shank protruding therefrom, the shank of the key arranged so as to operate a mechanical door lock; and B) a portable hand-held key fob comprising:

a) a housing comprising (i) a recess in which the head of the key is located;

(ii) an opening through which the shank of the key protrudes ; and (iii) a pivot-enabling device configured to enable the key to pivot in a first direction with respect to the housing when the shank of the key is inserted within a lock cylinder and the housing is turned in a clockwise direction, and in a second direction with respect to the housing when the shank of the key is inserted within a lock cylinder and the housing is turned in a counterclockwise direction;

b) a position sensing device configured to sense a position of the housing with respect to the key; and c) circuitry, comprising an RF transmitter, configured to transmit a first RF signal when the position sensing device senses that the housing is turned in a clockwise direction with respect to the key, and a second RF signal when the position sensing device senses that the housing is turned in a counterclockwise direction with respect to the key.

8. The key fob of claim 7 further comprising a switch that is configured to enable transmission of the first signal and the second signal only when the housing is urged against an exterior surface.

9. A method of controlling a security system comprising the steps of:

A) providing a portable hand-held key-operated keyfob combination comprising:

I) a lock-opening key comprising a head and a shank protruding therefrom, the shank of the key arranged so as to operate a mechanical door lock; and II) a portable hand-held a key fob comprising a) a housing comprising (i) a recess comprising a mounting plate against which the head of the key is mounted;

(ii) an opening configured to allow the shank of the key to protrude therefrom ; and (iii) a fulcrum integral with an inner wall within the recess on which the mounting plate rests thereon, the fulcrum generally bisecting the recess into a first region on a first side of the mounting plate and a second region on a second side of the mounting plate;

b) a first switch located in the first region, and a second switch located in the second region, each of said switches configured to be in an open position when the mounting plate rests on the fulcrum in a nominal position, the first switch being caused to close when the housing is turned in a first direction with respect to the mounting plate mounted with the head of the key, and the second switch being caused to close when the housing is turned in a second direction with respect to the mounting plate mounted with the head of the key; and c) circuitry , comprising an RF transmitter, configured to transmit a first RF signal when the first switch is closed and a second RF signal when the second switch is closed;

B) inserting the shank of the key within a cylinder of a lock;

C) turning the housing in a first direction with respect to the cylinder so as to cause the key to open the lock, and the first switch to close; and D) transmitting a first signal as a result of the closing of the first switch.

10. The method of claim 9 further comprising the step of

E) disarming the security system by a control panel as a result of receiving and decoding the first signal transmitted by the key fob combination.

11. The method of claim 10 further comprising the steps of:

F) inserting the key within a cylinder of a lock;

G) turning the housing in a second direction with respect to the cylinder so as to cause the key to close the lock, and the second switch to close; and H) transmitting a second signal as a result of the closing of the second switch.

12. The method of claim 9 further comprising the step of:

I) arming the security system by a control panel as a result of receiving and decoding the second signal transmitted by the key fob combination.

13. The key fob of claim 1 wherein the circuitry is further configured to prevent transmission of the second signal unless a predetermined time has elapsed from the transmission of the first signal.

14. The key fob of claim 1 wherein the circuitry is further configured to prevent transmission of the first signal unless a predetermined time has elapsed from the transmission of the second signal.

* * * * *